United States Patent
Dolsak

(10) Patent No.: US 9,030,194 B2
(45) Date of Patent: May 12, 2015

(54) POSITION ENCODER APPARATUS

(75) Inventor: Gregor Dolsak, Velike Lasce (SI)

(73) Assignees: RLS Merilna Tehnika D.O.O., Ljubljana (SI); Renishaw PLC, Wotton-Under-Edge (GB)

( * ) Notice: Subject to any disclaimer, the term of this patent is extended or adjusted under 35 U.S.C. 154(b) by 392 days.

(21) Appl. No.: 13/203,937

(22) PCT Filed: Mar. 1, 2010

(86) PCT No.: PCT/GB2010/000364
§ 371 (c)(1),
(2), (4) Date: Aug. 30, 2011

(87) PCT Pub. No.: WO2010/100407
PCT Pub. Date: Sep. 10, 2010

(65) Prior Publication Data
US 2012/0025812 A1 Feb. 2, 2012

(30) Foreign Application Priority Data

Mar. 2, 2009 (GB) .................................. 0903550.2

(51) Int. Cl.
*G01B 7/14* (2006.01)
*G01D 5/244* (2006.01)
*G01D 5/36* (2006.01)

(52) U.S. Cl.
CPC .......... *G01D 5/24438* (2013.01); *G01D 5/2448* (2013.01); *G01D 5/36* (2013.01)

(58) Field of Classification Search
USPC ............... 324/207.11–207.26, 225, 173, 252; 33/810, 784, 706–708; 341/13, 15, 10
See application file for complete search history.

(56) References Cited

U.S. PATENT DOCUMENTS 4,595,991 A 6/1986 Spies
4,663,588 A 5/1987 Himuro et al.
(Continued)

FOREIGN PATENT DOCUMENTS

CN 101290220 A 10/2008
DE 39 42 625 A1 6/1990
(Continued)

OTHER PUBLICATIONS

British Search Report dated Aug. 17, 2009 issued in British 0903550.2.
(Continued)

*Primary Examiner* — Huy Q Phan
*Assistant Examiner* — Thang Le
(74) *Attorney, Agent, or Firm* — Oliff PLC

(57) ABSTRACT

A scanning device for a position encoder is provided that comprises a plurality of sensor elements for generating a plurality of sensor signals. A summation unit is also provided for generating at least a first summation signal and a second summation signal that provide information on the relative alignment of the scanning device and an associated scale. The first summation signal is generated from a first subset of the plurality of sensor signals and the second summation signal is generated from a second subset of the plurality of sensor signals. The plurality of sensor elements are substantially evenly spaced apart from one another N and sensor elements are provided per period of an associated scale, wherein N is an integer value and a multiple of three and four. In this manner, the third harmonic contribution to the summation signals is suppressed.

16 Claims, 13 Drawing Sheets

(56) References Cited

U.S. PATENT DOCUMENTS

| | | | |
|---|---|---|---|
| 4,782,229 | A | 11/1988 | Ernst |
| 4,818,939 | A | 4/1989 | Takahashi et al. |
| 4,874,053 | A * | 10/1989 | Kimura et al. ............... 180/443 |
| 4,949,289 | A | 8/1990 | Stephens et al. |
| 4,983,828 | A | 1/1991 | Stephens |
| 5,019,776 | A | 5/1991 | Kawamata et al. |
| 5,068,529 | A | 11/1991 | Ohno et al. |
| 5,287,630 | A * | 2/1994 | Geisler ............................ 33/706 |
| 6,158,132 | A | 12/2000 | Kofink et al. |
| 7,183,535 | B2 | 2/2007 | Velikotny et al. |
| 7,378,839 | B2 * | 5/2008 | Abe et al. ................. 324/207.21 |
| 7,461,464 | B2 | 12/2008 | Mittmann et al. |
| 2002/0105445 | A1 | 8/2002 | Shirai et al. |
| 2007/0085530 | A1 * | 4/2007 | Mawet .................... 324/207.16 |
| 2008/0257951 | A1 | 10/2008 | Mayer et al. |
| 2009/0058404 | A1 * | 3/2009 | Kurumado ............... 324/207.25 |
| 2009/0115405 | A1 * | 5/2009 | Guo et al. ................. 324/207.14 |
| 2010/0052664 | A1 * | 3/2010 | Nishizawa et al. ...... 324/207.25 |
| 2010/0156400 | A1 * | 6/2010 | Noguchi et al. ......... 324/207.25 |

FOREIGN PATENT DOCUMENTS

| | | |
|---|---|---|
| DE | 42 09 629 A1 | 10/1992 |
| DE | 195 080 700 C1 | 8/1996 |
| EP | 1 653 625 A2 | 5/2006 |
| EP | 1 752 851 A1 | 2/2007 |
| JP | A-63-225124 | 9/1988 |
| JP | A-64-54787 | 3/1989 |
| JP | A-07-286861 | 10/1995 |
| JP | A-2001-33277 | 2/2001 |
| JP | A-2003-501604 | 1/2003 |
| JP | A-2007-178267 | 7/2007 |
| WO | WO 03/021197 A1 | 3/2003 |
| WO | WO 03/058172 A2 | 7/2003 |

OTHER PUBLICATIONS

International Search Report mailed Jun. 29, 2010 issued in International Patent Application No. PCT/GB2010/000364.

Written Opinion of the International Searching Authority mailed Jun. 29, 2010 issued in International Patent Application No. PCT/GB2010/000364.

Office Action issued in Chinese Application No. 201080010455.1 dated Aug. 30, 2013 (with translation).

Office Action issued in Japanese Application No. 2011-552497 dated Jul. 23, 2013 (with translation).

* cited by examiner

| Signal | Sine | Cosine |
|---|---|---|
| S1 | + | Not used |
| S2 | + | Not used |
| S3 | Not used | Not used |
| S4 | Not used | + |
| S5 | - | + |
| S6 | - | Not used |
| S7 | - | Not used |
| S8 | - | - |
| S9 | Not used | - |
| S10 | Not used | - |
| S11 | + | - |
| S12 | + | Not used |
| S13 | Not used | Not used |
| S14 | Not used | + |
| S15 | Not used | + |

| Signal | Sine | Cosine |
|---|---|---|
| S1 | + | Not used |
| S2 | + | Not used |
| S3 | + | Not used |
| S4 | + | Not used |
| S5 | + | Not used |
| S6 | + | Not used |
| S7 | + | Not used |
| S8 | + | Not used |
| S9 | Not used | Not used |
| S10 | Not used | Not used |
| S11 | + | Not used |
| S12 | + | Not used |
| S13 | Not used | Not used |
| S14 | Not used | Not used |
| S15 | Not used | Not used |
| S16 | Not used | + |
| S17 | Not used | + |
| S18 | Not used | + |
| S19 | - | + |
| S20 | - | + |
| S21 | Not used | + |
| S22 | Not used | + |
| S23 | - | + |
| S24 | - | Not used |
| S25 | - | Not used |
| S26 | - | + |
| S27 | - | + |
| S28 | - | Not used |
| S29 | - | Not used |
| S30 | - | Not used |
| S31 | - | Not used |
| S32 | - | Not used |
| S33 | - | Not used |
| S34 | - | - |
| S35 | - | - |
| S36 | - | Not used |
| S37 | - | Not used |
| S38 | - | - |
| S39 | Not used | - |
| S40 | Not used | - |

| Signal (Cont.) | Sine (Cont.) | Cosine (Cont.) |
|---|---|---|
| S41 | - | - |
| S42 | - | - |
| S43 | Not used | - |
| S44 | Not used | - |
| S45 | Not used | - |
| S46 | Not used | - |
| S47 | Not used | - |
| S48 | Not used | - |
| S49 | + | - |
| S50 | + | - |
| S51 | Not used | - |
| S52 | Not used | - |
| S53 | + | - |
| S54 | + | Not used |
| S55 | + | Not used |
| S56 | + | - |
| S57 | + | - |
| S58 | + | Not used |
| S59 | + | Not used |
| S60 | + | Not used |
| S61 | Not used | Not used |
| S62 | Not used | Not used |
| S63 | Not used | Not used |
| S64 | Not used | + |
| S65 | Not used | + |
| S66 | Not used | Not used |
| S67 | Not used | Not used |
| S68 | Not used | + |
| S69 | Not used | + |
| S70 | Not used | + |
| S71 | Not used | + |
| S72 | Not used | + |
| S73 | Not used | + |
| S74 | Not used | + |
| S75 | Not used | + |

FIGURE 6

| Signal | Sine | Cosine |
| --- | --- | --- |
| S1 | + | Not used |
| S2 | + | + |
| S3 | Not used | + |
| S4 | Not used | + |
| S5 | - | + |
| S6 | - | Not used |
| S7 | - | Not used |
| S8 | - | - |
| S9 | Not used | - |
| S10 | Not used | - |
| S11 | + | - |
| S12 | + | Not used |

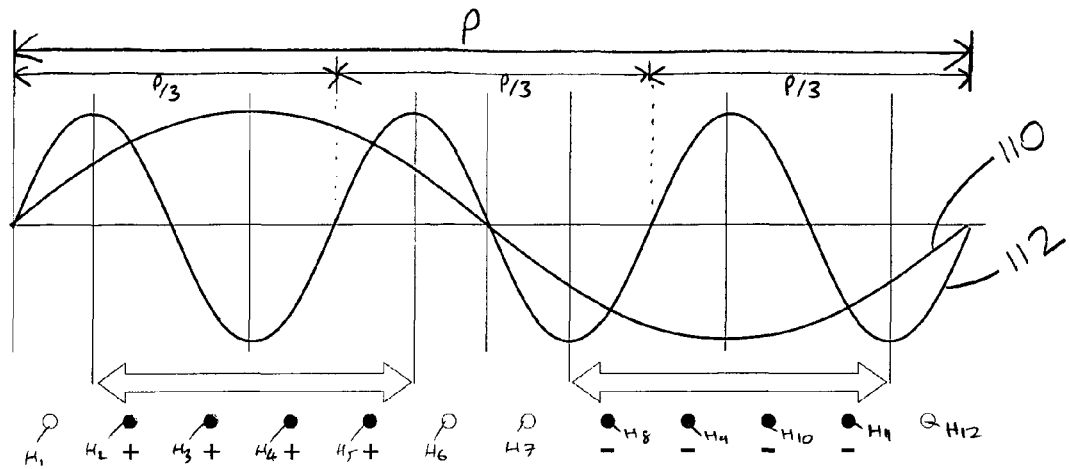

FIGURE 11

| Signal | Sine | Cosine | Signal (cont.) | Sine (cont.) | Cosine (cont.) |
|---|---|---|---|---|---|
| S1 | + | Not used | S31 | - | Not used |
| S2 | + | Not used | S32 | - | Not used |
| S3 | + | Not used | S33 | - | Not used |
| S4 | + | + | S34 | - | - |
| S5 | + | + | S35 | - | - |
| S6 | + | Not used | S36 | - | Not used |
| S7 | + | Not used | S37 | - | Not used |
| S8 | + | + | S38 | - | - |
| S9 | Not used | + | S39 | Not used | - |
| S10 | Not used | + | S40 | Not used | - |
| S11 | + | + | S41 | - | - |
| S12 | + | + | S42 | - | - |
| S13 | Not used | + | S43 | Not used | - |
| S14 | Not used | + | S44 | Not used | - |
| S15 | Not used | + | S45 | Not used | - |
| S16 | Not used | + | S46 | Not used | - |
| S17 | Not used | + | S47 | Not used | - |
| S18 | Not used | + | S48 | Not used | - |
| S19 | - | + | S49 | + | - |
| S20 | - | + | S50 | + | - |
| S21 | Not used | + | S51 | Not used | - |
| S22 | Not used | + | S52 | Not used | - |
| S23 | - | + | S53 | + | - |
| S24 | - | Not used | S54 | + | Not used |
| S25 | - | Not used | S55 | + | Not used |
| S26 | - | + | S56 | + | - |
| S27 | - | + | S57 | + | - |
| S28 | - | Not used | S58 | + | Not used |
| S29 | - | Not used | S59 | + | Not used |
| S30 | - | Not used | S60 | + | Not used |

FIGURE 12

| Hall # | Period | Scheme A | | Scheme B | | Scheme C1 | | Scheme C2 | |
|---|---|---|---|---|---|---|---|---|---|
| | | Sin | Cos | Sin | Cos | Sin | Cos | Sin | Cos |
| 1 | 1 | - | | | - | - | | + | |
| 2 | 1 | - | | | - | - | | + | |
| 3 | 1 | - | | | | | | | |
| 4 | 1 | + | - | + | | | - | | + (x2) |
| 5 | 1 | + | - | + | + | + | - | - | + (x2) |
| 6 | 1 | + | - | | + | + | | - | |
| 7 | 1 | + | + | | + | + | | - (x2) | |
| 8 | 1 | + | + | - | + | + | + | - (x2) | - (x2) |
| 9 | 1 | + | + | - | | | + | | - (x2) |
| 10 | 1 | - | + | - | | | + | | - (x2) |
| 11 | 1 | - | + | - | - | - | + | + (x2) | - (x2) |
| 12 | 1 | - | + | | - | - | | + (x2) | |
| 13 | 2 | - | - | | - | | | + | |
| 14 | 2 | - | - | + | - | | - | + | + (x2) |
| 15 | 2 | - | - | + | | | - | | + (x2) |
| 16 | 2 | + | - | + | | | - | | |
| 17 | 2 | + | - | + | + | | - | - | |
| 18 | 2 | + | - | | + | | | - | |
| 19 | 2 | + | + | | + | + | | | |
| 20 | 2 | + | + | - | + | + | + | | |
| 21 | 2 | + | + | - | | | + | | |
| 22 | 2 | - | + | - | | | + | | |
| 23 | 2 | - | + | - | - | - | + | | |
| 24 | 2 | - | + | | - | - | | | |
| 25 | 3 | - | - | | - | - | | | |
| 26 | 3 | - | - | + | - | - | - | | |
| 27 | 3 | - | - | + | | | - | | |
| 28 | 3 | + | - | + | | | | | |
| 29 | 3 | + | - | + | + | + | | | |
| 30 | 3 | + | - | | + | + | | | |
| 31 | 3 | + | + | | + | | | | |
| 32 | 3 | + | + | - | + | | | | |
| 33 | 3 | + | + | - | | | | | |
| 34 | 3 | - | + | - | | | | | |
| 35 | 3 | - | + | - | - | | | | |
| 36 | 3 | - | + | | - | | | | |
| 37 | 4 | | - | | | | | | |
| 38 | 4 | | - | + | | | | | |
| 39 | 4 | | - | + | | | | | |

FIGURE 18

POSITION ENCODER APPARATUS

The present invention relates to position encoder apparatus and in particular to a scanning device for a position encoder that employs an improved technique for combining the sensor signals from multiple (e.g. magnetic) sensors to obtain incremental position information.

Many different types of position encoder are known. For example, optical encoder systems are known in which a scale comprising light and dark lines is read by an optical readhead. Magnetic encoders are also known in which the varying magnetic properties of a scale are read by a readhead unit that comprises one or more magnetic (e.g. Hall) sensors.

One known type of position encoder system comprises a scale that is formed as a regularly repeating pattern of scale markings. A readhead comprising multiple spaced apart sensors is used to measure any relative movement between the scale and readhead. In particular, the sensor signals from the multiple spaced apart sensors in the readhead are combined to produce sine and cosine (phase quadrature) signals that can be interpolated to provide an accurate measure of the position of the readhead to less than one period of the repeating scale pattern. Such incremental position information can optionally be combined with additional, coarser, measurements of absolute position.

U.S. Pat. No. 4,949,289 describes a method for generating sine and cosine incremental signals by appropriately combining the signals from four sensors. It is also known, for example from U.S. Pat. No. 4,595,991, to provide an encoder device in which the outputs of six sensors are combined to generate sine and cosine signals that are interpolated to provide higher resolution position information. In particular, U.S. Pat. No. 4,595,991 describes a technique in which the outputs of six sensors are weighted, using predetermined Fourier coefficients, prior to being combined. This weighting is said to reduce the contribution of higher order (e.g. third) harmonic components to the resultant sine/cosine signals thereby improving the resolution of the interpolation process. The technique of U.S. Pat. No. 4,595,991 is, however, complex to implement and requires the accurate weighting of sensor signals before they are combined. This can prove difficult and expensive to implement electronically.

According to a first aspect of the present invention, a scanning device for a position encoder comprises a plurality of sensor elements for generating a plurality of sensor signals; a summation unit for generating at least a first summation signal and a second summation signal that provide information on the relative alignment of the scanning device and an associated scale; wherein the first summation signal is generated from a first subset of the plurality of sensor signals and the second summation signal is generated from a second subset of the plurality of sensor signals, characterised in that the plurality of sensor elements are substantially evenly spaced apart from one another and N sensor elements are provided per period of an associated scale, wherein N is an integer value and a multiple of three and four.

The present invention thus provides a readhead or scanning device for a position encoder. The scanning device comprises a plurality of sensor elements for generating a plurality of sensor signals. For example, the scanning device may comprise multiple, spaced apart, Hall sensor elements that each output a sensor signal of a voltage that is indicative of sensed magnetic field strength. A summation unit is also provided for generating at least a first summation signal and a second summation signal that contain information about the relative alignment or phase of the scanning device and an associated scale.

The summation unit generates the first summation signal from a first subset of the plurality of sensor signals and the second summation signal from a second (different) subset of the plurality of sensor signals. In particular, the summation unit may produce each summation signal by the addition and/or subtraction of the various sensors signals of the respective subset. It should be understood that a subset of sensor signals means a group of some, but not all, of the set of sensor signals that are generated by the plurality of sensor elements. As explained in more detail below, the first and second subsets may include common sensor signals; i.e. the first and second subsets are preferably not mutually exclusive. It is also possible that one or more of the sensor signals generated by the plurality of sensor elements may not form part of either the first or second subsets.

The present invention thus uses selected subsets of sensor signals to produce summation signals. This mitigates various disadvantages associated with known arrangements of the type described in U.S. Pat. No. 4,595,991. In particular, the present invention does not require the calculation of Fourier weighting coefficients nor the use of integrated circuits having multiple different value resistors that implement the necessary Fourier weighting. Instead, the present invention uses a summation unit that combines selected subsets of sensor signals to generate the required summation signals. The present invention is thus simpler, and cheaper to implement, than prior art devices of the type described in U.S. Pat. No. 4,595,991.

As outlined above, the plurality of sensor elements of the scanning unit are substantially evenly spaced apart from one another and N evenly spaced sensor elements are provided per period of an associated scale, wherein N is an integer value and a multiple of three and four. Providing such an arrangement of sensor elements enables subsets of the sensor signals to be selected that are substantially unaffected by the third harmonic variation mentioned above. This is advantageous over incremental schemes of the type described in U.S. Pat. No. 4,949,289 in which the use of fewer (e.g. four or five) sensors is described thereby resulting in third harmonic contributions to the incremental signals that are generated.

In the majority of practical encoder systems, suppression of the third harmonic in accordance with the present invention provides sufficient measurement accuracy. It is, however, possible to also suppress the fifth harmonic. This can be achieved by providing N sensor elements per period of the associated scale, wherein N is a multiple of four, three and five.

Advantageously, the first summation signal and the second summation signal vary periodically as the scanning device is moved relative to an associated scale. As outlined below, such a scale could comprise a periodically repeating pattern of scale markings. Preferably, the first summation signal comprises a sine signal and the second summation signal comprises a cosine signal. In other words, the summation unit of the device preferably produces a pair of sine/cosine (quadrature phase) signals as it is moved relative to an associated scale. Such sine/cosine signals can be interpolated in a known manner to provide a measure of the relative alignment or phase of the scanning device and an associated scale.

The first subset of the plurality of sensor signals preferably differs from, but overlaps with, the second subset of the plurality of sensor signals. In other words, at least two overlapping subsets of sensor signals are preferably used to generate at least two summation signals from the set of sensor signals produced by the multiple sensor elements. More details about the selection of suitable subsets of sensor signals are outlined below.

For a magnetic encoder, the associated magnetic scale read by the scanning device may comprise a periodically repeating series of magnetic features. For example, an active magnetic scale may comprise a regularly repeating series of north and south magnetic poles. The magnetic field profile of such an active magnetic scale typically varies sinusoidally. In addition to the first harmonic variation in magnetic field strength, higher harmonic orders will also contribute to the magnetic field sensed by the plurality of magnetic sensor elements. Suppression of even order harmonics can be readily achieved by using a scanning device having an even number of sensor elements per scale period. In order to suppress the third harmonic contribution from a summation signal without having to weight the sensor signals using Fourier coefficients, the number of sensor elements provided per period of an associated scale is a multiple of both three and four.

Advantageous, the scanning device comprises at least twelve sensor elements. Conveniently, the scanning device comprises at least sixty sensor elements. If the scanning device is arranged to read a linear scale, the sensor elements may be arranged to cover more than one period of the scale as outlined below. At least fifteen sensor elements may then be advantageously provided.

Advantageously, the first subset of the plurality of sensor sensors is selected such that, when the sensor signals are summed together by the summation unit, the contribution of the third harmonic component (e.g. of the varying magnetic field of an associated scale) to the first summation signal is substantially zero. Conveniently, the second subset of the plurality of sensor sensors is selected such that, when the sensor signals are summed together by the summation unit, the contribution of the third harmonic component (e.g. of the varying magnetic field of an associated scale) to the second summation signal is substantially zero. In other words, appropriate selection of the sensor signals that are summed together to form the first and second summation signals can be used to suppress or substantially reduce any third harmonic contribution, irrespective of the relative position of the scale and scanning device, to those summation signals. This has been found to be more readily achievable when, as outlined above, the number of sensors elements provided per period of an associated scale is a multiple of both three and four. It should again be noted that summing sensor signals refers to the addition and/or subtraction of sensor signals. A similar selection process can also be used to suppress the fifth harmonic contribution, although more sensor elements per period of scale are typically required as outlined above. Various suitable combination schemes are described in detail below.

Advantageously, the summation unit generates the first summation signal by summing the first subset of sensor signals with integer weightings. Similarly, the summation unit may generate the second summation signal by summing the second subset of sensor signals with integer weightings. In other words, the sensor signals of each of the first and/or second subset are preferably only weighted by an integer value (e.g. 1 or 2) prior to being combined by the summation unit. Advantageously, the integer value is one. In other words, it is preferred that the sensor signals are given equal weighting (e.g. +1 or −1) when being summed by the summation unit to form the first and second summation signals.

The scanning device may be configured to read a linear scale. The linear scale or scale track may comprise a series of periodically repeating scale markings, such as magnetic scale markings, having a period p. In such an example, the scanning device preferably comprises a linear array of spaced apart sensor elements. Advantageously, the sensor elements are evenly spaced apart from one another. To allow sine and cosine information to be unambiguously read from the scale, enough sensor elements are advantageously provided to simultaneously read more than one period of the scale track. Advantageously, the plurality of sensor elements are arranged to cover at least 1.25, 2.5 or 3.25 periods of an associated scale.

The scanning device may be configured to operate as part of a rotary encoder. In such a rotary encoder, the rotary scale may comprise a rotating actuator, such as a magnetic dipole. In such an example, the scanning device preferably comprises a plurality of sensor elements substantially equidistantly spaced from an axis of rotation and separated from one another by a substantially equal angle. The period of such a rotary scale is thus 360° and N sensor elements (N being a multiple of three and four) are provided at equal angular separations around the axis of rotation. In this manner, the absolute angular orientation of the rotary scale relative to the scanning device can be determined.

Advantageously, the scanning device is a magnetic scanning device. In other words, the scanning device preferably comprises a plurality of sensor elements in the form of magnetic sensor elements. The magnetic sensor elements may be magneto-resistive magnetic elements or Hall sensors. Such magnetic sensor elements may be used to sense variations in the magnetic field of an associated magnetic scale.

A magnetic scanning device of the present invention may be used with so-called active magnetic scale in which a series of magnetic (north/south) poles provide the required scale markings. Preferably, the magnetic scanning device is suitable for use with a so-called passive magnetic scale in which the scale markings are provided by local differences in the magnetic permeability of the scale. The scanning device preferably comprises a magnet or magnets. The magnet(s) may comprise permanent (e.g. rare earth) magnets and/or electromagnets. Advantageously, the plurality of sensor elements are located within the magnetic field of the magnet(s). For example, the plurality of sensor elements may be located adjacent to the plurality of magnetic sensor elements. Preferably, an associated passive magnetic scale can be placed adjacent the plurality of sensor elements and also within the magnetic field produced by the magnet. In this manner, variations in the magnetic permeability of the scale alters the magnetic field strength detected by the plurality of sensor elements. Passive magnetic scales have the advantage that they will not, unlike active magnetic scales, become demagnetised in use. Passive magnetic scales are thus typically more suited to use in harsh environments.

As mentioned above, the first summation signal and the second summation signal may be periodically varying, e.g. sine/cosine, signals. The scanning device conveniently comprises an interpolation unit for interpolating the first summation signal and the second summation signal to provide an interpolated position output. The interpolation factor applied by the interpolation unit may be set as required.

As outlined above, the first and second summation signals may be used to provide incremental or relative position information. For example, interpolation of the first and second summation signals can provide the relative alignment or phase of the scanning device relative to a periodically varying scale pattern. Such information does not, on its own, provide a measure of absolute position for a linear encoder system. The scanning device thus conveniently also comprises an absolute scale reader for reading data bits from the absolute scale track of an associated scale to provide absolute position information. For example, the associated scale may comprise a periodically varying (incremental) track adjacent an absolute scale track. The absolute scale track may include a series of codewords that uniquely define absolute position. The scanning device advantageously further comprises a position calculation unit for combining the interpolated position output and the absolute position information to provide enhanced resolution absolute position information. In other words, the high resolution information provided from the first and second summation signals may be combined with the, typically coarser, information provided by the absolute position scale reader. In this manner, finer resolution absolute position information can be generated.

Advantageously, the summation unit and/or the plurality of sensor elements are provided on a common substrate. For example, a single silicon wafer may provide a plurality of Hall sensors and the circuitry necessary to implement the summation unit. The scanning device may also be incorporated in a housing or similar to provide a readhead that can be attached to a machine part.

Position encoder apparatus may also be provided in accordance with the present invention that comprises a scanning device of the type described above and a scale. Appropriate housings or casing may also be provided as required.

According to a second aspect, the invention provides a method for measuring position, the method comprising the steps of (i) receiving a plurality of sensor signals from a plurality of sensor elements, and (ii) generating a first summation signal from a first subset of the plurality of sensor signals and a second summation signal from a second subset of the plurality of sensor signals, characterised by the plurality of sensor elements being substantially evenly spaced apart from one another and by N sensor elements being provided per period of an associated scale, wherein N is an integer value and a multiple of three and four.

According to a further aspect of the invention, a scanning device for a position encoder is provided that comprises: a plurality of sensor elements for generating a plurality of sensor signals; a summation unit for generating at least a first summation signal and a second summation signal that provide information on the relative alignment of the scanning device and an associated scale; wherein the first summation signal is generated from a first subset of the plurality of sensor signals and the second summation signal is generated from a second subset of the plurality of sensor signals, wherein the first subset of the plurality of sensor signals is selected such that, when the sensor signals are summed together by the summation unit, the contribution of the third harmonic component to the first summation signal is substantially zero. Preferably, the second subset of the plurality of sensor signals is selected such that, when the sensor signals are summed together by the summation unit, the contribution of the third harmonic component to the second summation signal is substantially zero.

Also described herein is a scanning device for a position encoder that comprises: a plurality of sensor elements for generating a plurality of sensor signals; a summation unit for generating at least a first summation signal and a second summation signal that provide information on the relative alignment of the scanning device and an associated scale; wherein the first summation signal is generated from a first subset of the plurality of sensor signals and the second summation signal is generated from a second subset of the plurality of sensor signals. The scanning device may also include any one or more of the features described above.

The invention will now be described, by way of example only, with reference to the accompanying drawings in which;

FIG. 1 shows magnetic position measuring apparatus of the present invention,

FIG. 2 illustrates in more detail the sensor array and magnetic scale of the apparatus of FIG. 1, FIG. 3 show a top-level block diagram of the apparatus illustrated in FIGS. 1 and 2, FIG. 4 illustrates scheme for combining fifteen sensor signals in accordance with the present invention, FIG. 5 shows an electronic circuit for implementing the summation scheme outlined in FIG. 4, FIG. 6 illustrates a further scheme for combining sensor signals in accordance with the present invention, FIG. 7 shows rotary encoder apparatus of the present invention, FIG. 8 is a further view of the encoder of FIG. 7, FIG. 9 outlines a summation scheme for use with the rotary encoder shown in FIGS. 7 and 8, FIG. 10 shows an electronic circuit for implementing the summation scheme outlined in FIG. 9, FIG. 11 illustrates how the summation scheme of FIG. 9 reduces the third harmonic, FIG. 12 illustrates a further summation scheme for use with a rotary encoder, FIG. 13 illustrates how the summation scheme of FIG. 12 reduces the third harmonic, FIG. 14 illustrates how the summation scheme of FIG. 12 reduces the fifth harmonic, FIG. 15 shows a readhead moveable along a linear scale having absolute and incremental scale tracks, FIG. 16 is a cross-section through the readhead and scale of FIG. 15, FIG. 17 illustrates the use of the readhead of FIG. 16 to generate incremental and absolute position data, FIG. 18 show four further summation schemes, FIGS. 19A-19D illustrate the sine signals produced using a differential summation scheme, FIGS. 20A-20D illustrate the sine signals produced using a summation scheme of the present invention, and FIGS. 21A-21D illustrate the sine signals produced using a further summation scheme of the present invention.

Referring to FIG. 1, a cross-sectional illustration of magnetic position measuring apparatus of the present invention is provided. The apparatus comprises a readhead comprising a housing 2 which is fastened to a first part 4 of a processing machine by a screw connection 6. A sensor array 8 comprising fifteen spaced apart magnetic sensor elements is located within the housing 2. Each magnetic sensor of the sensor array provides an output or sensor signal that is analysed by processing electronics 10. A second part 12 of the processing machine is moveably relative to the first part 4 of that machine and carries a magnetic scale 14 that comprises a periodically magnetized rubber magnet.

The separation between the sensor array 8 and the magnetic scale 14 (which is often termed the ride-height) is preferably made as small as possible to maximise the magnetic field present at the sensor array 8. It is also preferred that variations in ride-height as the first and second parts of the processing machine move relative to one another are minimised.

Referring to FIG. 2, a schematic illustration of the magnetic sensor array 8 and magnetic scale 14 described above with reference to FIG. 1 is provided. The sensor array 8 comprises fifteen equally distributed magnetic sensor elements 16. The magnetic scale 14 has a period or pitch p and the magnetic sensors elements 16 are spaced apart from one another by one twelfth of the pitch p of the magnetic scale 14. It can thus be seen that the magnetic sensor elements 16 of the sensor array 8 cover one and a quarter periods of the magnetic scale 14.

Also illustrated in FIG. 2 is a plot of the normal component of the magnetic flux density 18; this can be seen to have a sinusoidal variation (of period p) along the magnetic scale 14. Providing a sensor array 8 with fifteen magnetic sensor elements allows the magnetic flux density to be measured over one and a quarter periods of the magnetic scale. This allows both cosine and sine signals (i.e. signals having a phase difference of 90° or one quarter of the period p) to be generated from two subsets of the magnetic sensor signals as described in more detail below.

Referring also to FIG. 3, a top-level block diagram of the magnetic position measuring apparatus described with reference to FIGS. 1 and 2 is shown. Variations in magnetic flux density B arising from the magnetic scale 14 are sensed by the fifteen magnetic sensor elements 16 of the sensor array 8. The sensor array 8 can thus be considered as part of a scanning unit 30 that produces fifteen magnetic sensors signals S1-S15; i.e. a magnetic sensor signal is produced by each magnetic sensor element 16 of the sensor array 8. The magnetic sensor signals S1-S15 are then passed to a summation unit 34. The summation unit 34 generates Sine and Cosine signals from first and second subsets of the magnetic sensors signals respectively using the summation schemes described below with reference to FIG. 4. An evaluation unit 36, such as an interpolator of known type, is used to generate a signal that indicates the change in the relative position of the first and second parts of the processing machine. The signals from the evaluation unit 36 are transmitted to a control or display unit 38 as required.

FIG. 4 illustrates how, in accordance with the present invention, first and second subsets of the fifteen magnetic sensors signals (S1-S15) can be combined to generate the required Sine and Cosine signals mentioned above. In particular, FIG. 4 is a list of the two subsets of sensor signals that are combined to provide the Sine and Cosine signals respectively. In FIG. 4, a "+" indicates that the respective sensor signal is added to other sensor signals to form the Sine or Cosine signal, a "−" that the respective sensor signal is subtracted from the other sensor signals to form the resultant Sine or Cosine signal and a "not used" that the particular sensor signal is not used in the generation of that resultant Sine or Cosine signal. It should be noted that the cosine signal is produced in the same way as the sine signal, but with the sensors displaced by one quarter of the scale period relative to the sensors used for generating the sine signal. It should be further noted that magnetic sensor signals S3 and S13 are not actually used and therefore need not be physically generated in the first place.

Referring to FIG. 5, an electronic circuit suitable for implementing the summation scheme outlined in FIG. 4 is shown. The fifteen magnetic sensor elements H1-H15 shown in FIG. 5 correspond to the fifteen equally distributed magnetic sensor elements 16 described above with reference to FIG. 2. The magnetic sensor elements H1-H15 generate analogue sensor signals S1-S15 respectively that are applied to the inputs of amplifiers V1-V15. Each of the amplifiers V1-V15 in the present example have the same gain. Selected outputs of the amplifiers V1-V15 are applied via resistors R to the inverting and non-inverting inputs of two operational amplifiers A1 and A2. The outputs of the operational amplifiers A1 and A2 are fed back via further resistors R' to their inverting inputs whilst the non-inverting inputs are connected to ground via respective resistors R".

The sensor signals applied to the inputs of the operational amplifiers A1 and A2 are selected in accordance with the scheme outlined in FIG. 4. In particular, the amplified analogue sensor signals S1, S2, S11 and S12 are combined and applied, via respective resistors R, to the non-inverting input of operational amplifier A1. The amplified analogue sensor signals S5, S6, S7 and S8 are combined and applied via resistors R to the inverting input of operational amplifier A1. The output $U_a$ from the operational amplifier A1 is the Sine signal. The amplified analogue sensor signals S4, S5, S14 and S15 are combined and applied, via resistors R, to the non-inverting inputs of operational amplifier A2. The amplified analogue sensor signals S8, S9, S10 and S11 are combined and applied via resistors R to the inverting inputs of operational amplifier A2. The output from operational amplifier A2 is $U_b$ which represents a cosine signal. The Sine and Cosine signals may then be passed to an interpolator of known type.

The result of interpolation by such an interpolator depends on many factors; e.g. the amplitude, offset, phase and harmonic distortion of both the Sine and Cosine signals. The measure of the accuracy of interpolation, which is also commonly referred to as the sub-divisional error (SDE), is the difference between the position, generated with interpolation, and the actual position within the period, and is typically repeated every period P.

It has been found that the summation scheme outlined in FIG. 4, that can optionally be implemented using the circuit described with reference to FIG. 5, reduces or substantially eliminates the effect of the third harmonic distortion on the Sine and Cosine signals. This improvement in the quality of the Sin/Cosine signals can greatly improve the measure of accuracy of the interpolation (i.e. the SDE) attained when the signals are interpolated to generate position information.

It should be noted that reducing the effects of the third harmonic distortion has been described previously in U.S. Pat. No. 4,595,991, but the prior technique is complicated and requires the calculation of Fourier coefficients that are used to weight the six sensor signals before they are combined to provide the necessary sine/cosine signals. The present invention provides a simple way of generating the sine/cosine signals by simply adding and subtracting evenly weighted subsets of sensor signals. The combination of evenly weighted sensor signals also has the advantage that the various resistors R used in the electronic circuitry all have the same resistance value, thereby reducing the cost and complexity of circuitry fabrication.

The above described scheme allows the complete removal, or at least a substantial reduction, in the third harmonic contribution to the sine and cosine signals. In addition, it has been found that such a scheme also reduces the effect of some of the higher harmonics. For example, the above scheme will also reduce the amplitude of the fifth and seventh harmonics by around 73%. In the majority of practical cases, the scheme described with reference to FIGS. 1 to 5 improves the quality of the sine/cosine signals enough that, when they are interpolated, sufficiently accurate position information can be obtained. There may, however, be some instances where the complete removal of the fifth harmonic is also required.

Referring to FIG. 6, a sensor signal combination scheme is illustrated for generating sine and cosine signals in which both the third and fifth harmonics are significantly reduced or eliminated. The scheme requires sixty, evenly spaced, magnetic sensor elements per period p of the magnetic scale and again requires enough magnetic sensor to cover one and a quarter periods of the magnetic scale to allow the generation of both sine and cosine signals. A total of seventy-five magnetic sensor elements are thus required. The combination scheme of FIG. 6 thus comprises two, overlapping, subsets of sensor signals for producing sine and cosine signals respectively.

The examples described with reference to FIGS. 1 to 6 relate to so-called linear encoders in which a readhead is moved along a length of magnetic scale. The present invention is, however, equally applicable to so-called rotary encoders.

Referring to FIG. 7, rotary encoder apparatus of the present invention is illustrated. The rotary encoder includes a readhead comprising a housing 70 that can be fastened to the bed of a processing machine (not shown). A sensor array 72 comprising twelve magnetic sensors is located within the housing 70 along with processing electronics 74 for analysing the sensor signals produced by the magnetic sensors of the sensor array 72. A magnetic actuator 76 is provided adjacent the readhead housing 70. The magnetic actuator 76 may comprise a cylindrical or cube like diametrically polarized magnet. In use, the magnetic actuator 76 is fastened to, and arranged to rotate with, the rotary axis 78 of a machine.

Referring next to FIG. 8, a schematic view of the rotary encoder of FIG. 7 along the rotary axis 78 is shown. In particular, FIG. 8 shows the arrangement of the twelve magnetic (Hall) sensor elements H1-H12 of the sensor array 72 relative to the magnetic actuator 76. The magnetic flux density generated by the magnetic actuator 76 has a sinusoidal distribution over the axis of rotation 78 and is sensed by the magnetic sensor elements H1-H12 of the sensor array 72. The twelve magnetic sensor elements H1-H12 are all spaced apart from the axis of rotation 78 by substantially the same distance and are angularly separated apart from each other by 30°.

Referring to FIG. 9, a summation scheme is shown for producing sine and cosine signals from sensor signals S1-S12 generated by the magnetic sensor elements H1-H12 that are described above with reference to FIG. 8. It can be seen that the cosine signal is produced from a combination of sensor signals that is shifted by 90° from those producing the sine signal. It should also be noted that the scheme shown in FIG. 9 for a rotary encoder is analogous to that illustrated in FIG. 4 for a linear system. As outlined above, the three additional magnetic sensor elements H13-H15 provided in the linear encoder embodiment enable both sine and cosine signal generation from a linear scale having multiple repeating periods of magnetic field variations. In a rotary encoder, only the twelve magnetic sensor elements H1-H12 are required because there is only the magnetic field from a single rotatable magnet to be measured.

Referring to FIG. 10, a circuit is shown that is suitable for implementing the summation scheme illustrated in FIG. 9. The magnetic sensor elements H1-H12 generate analogue sensor signals S1-S12 respectively that are applied to the inputs of amplifiers V1-V12. Each of the amplifiers V1-V12 in the present example have the same gain. Selected outputs of the amplifiers V1-V12 are applied via resistors R to the inverting and non-inverting inputs of two operational amplifiers A1 and A2. The outputs of the operational amplifiers A1 and A2 are fed back via further resistors R' to their inverting inputs whilst the non-inverting inputs are connected to ground via respective resistors R".

The sensor signals applied to the inputs of the operational amplifiers A1 and A2 are selected in accordance with the scheme outlined in FIG. 9. In particular, the amplified analogue sensor signals S1, S2, S11 and S12 are combined and applied, via respective resistors R, to the non-inverting input of operational amplifier A1. The amplified analogue sensor signals S5, S6, S7 and S8 are combined and applied via respective resistors R to the inverting input of operational amplifier A1. The output $U_a$ from the operational amplifier A1 is the Sine signal. The amplified analogue sensor signals S2, S3, S4 and S5 are combined and applied, via respective resistors R, to the non-inverting input of operational amplifier A2. The amplified analogue sensor signals S8, S9, S10 and S11 are combined and applied, via respective resistors R, to the inverting inputs of operational amplifier A2. The output from operational amplifier A2 is $U_b$ which represents a cosine signal. The Sine and Cosine signals may then be passed to an interpolator of known type.

Referring to FIG. 11, it is shown how the summation scheme of FIG. 9 has the effect of suppressing the third harmonic. In particular, FIG. 11 illustrates how the twelve magnetic sensor elements H1-H12 detect a sinusoidally varying magnetic field 110 having a period p. This period p corresponds to the period of the first harmonic contribution to the magnetic field profile. The third harmonic contribution 112 has, by definition, a period of one third of the period p. The sensor scheme outlined in FIG. 9 for producing the cosine signal is illustrated in FIG. 11. The sensor elements that generate the sensor signals used to produce the cosine signal (i.e. elements H2-H5 and H8-H11) are illustrated as solid circles in FIG. 11 whereas the sensor elements that are not used in the cosine signal generation are shown as hollow circles. The signs used when combining the signals from elements H2-H5 and H8-H11 are also provided adjacent the respective sensor elements.

Combining the sensor signals in the illustrated manner has the effect that, irrespective of the phase or relative position of the magnetic field profile, the contribution to the cosine signal from the third harmonic signal 112 is always substantially zero. All even harmonics are also substantially suppressed, along with odd harmonics that are a multiple of three (e.g. the ninth harmonic, the fifteenth harmonic etc). The contribution of the fifth and seventh harmonics to the cosine signal is also substantially reduced (e.g. by more than seventy percent). An analogous improvement is also provided for the sine signal, which is produced by combining a subset of sensor signals that are offset by 90° from those providing the cosine signal.

Following the above, it can be seen that it is preferred that no fewer than twelve, equally spaced, magnetic sensor elements are provided per period p of the magnetic field variation. This is because the number of evenly spaced sensor elements required to substantially remove the effect of the third harmonic (whilst still being able to measure the first harmonic) is preferably a multiple of both four and three.

The rotary encoder described with reference to FIGS. 7-11 allows the complete removal, or at least a substantial reduction, in the third harmonic contribution to the sine and cosine signals. However, as mentioned above for the corresponding linear encoder, there are certain instances where removal of the fifth harmonic is also required.

Referring to FIG. 12, a sensor signal combination scheme is illustrated for generating sine and cosine signals in a rotary encoder in which both the third and fifth harmonics are significantly reduced or eliminated. The scheme uses sixty magnetic sensor elements that are evenly distributed about the central axis of rotation of the magnetic actuator. The combination scheme of FIG. 12 comprises two, overlapping, subsets of sensor signals for producing sine and cosine signals respectively. The suppression of the third and fifth harmonics using this scheme will now be explained with reference to FIGS. 13 and 14.

FIG. 13 shows, for clarity, only one half of the magnetic sensor elements that are used to implement the scheme outlined in FIG. 12. In particular, sensor elements H1-H30 are illustrated in FIG. 13 as circles. Again, a solid circle represents a sensor that is used to generate the cosine signal whilst a hollow circle indicates a sensor that is not used for that purpose. As only sensor elements H1-H30 are shown, all the sensor elements in FIG. 13 provide signals that are added together to form the cosine signal; i.e. they have a positive (+) sign. It should also be noted that the other half of the summation scheme (i.e. using sensor elements H31-H60) is opposite and symmetrical to the illustrated half and those selected sensor signals are subtracted from the other sensor signals; i.e. they have a negative (−) sign.

Also illustrated in FIG. 13 is one half of the first harmonic 132 variation in magnetic field strength. One and a half periods of the third harmonic contribution 134 to the magnetic field is also shown. It can be see that, using the selected subset of sensor elements, the net contribution of the third harmonic to the combined signal will always be zero because a whole period of that third harmonic is simultaneously sensed.

Referring next to FIG. 14, removal of the fifth harmonic contribution to the signal is illustrated. In particular, sensor elements H1-H30 are illustrated in FIG. 14 as circles with a solid circle representing a sensor that is used to provide the cosine signal. The first harmonic 132 and fifth harmonic 140 contributions to the combined signal are also shown. The fifth harmonic signal 140 is subdivided into three parts A, B and C. Part C is over one period of the fifth harmonic and the average is therefore zero. Parts B are of opposite sign and the average contribution of the fifth harmonic is zero. Similarly, parts A are of opposite sign such that the net contribution of the fifth harmonic to the combined signal is again zero.

The combination scheme outlined in FIG. 12 can thus be seen, as explained with reference to FIGS. 13 and 14, to substantially remove the effect of the third and fifth harmonics from the combined sensor signal. In particular, the amplitude of the third, fifth, ninth and fifteenth harmonics are substantially eliminated. The amplitudes (relative to the first harmonic) of the seventh, eleventh, thirteenth and seventeenth are also reduced to around 12%, 23%, 24% and 20% respectively. It should be noted that the third, fifth and seventh harmonics could be substantially eliminated using at least 420 (i.e. 4×3×5×7) spaced apart sensor elements per period of magnetic field variation. However, in such systems, the large number of additional magnetic sensor element is cost prohibitive for the relatively small improvement in measurement accuracy would be obtained.

The embodiments outlined above with reference to FIGS. 1 to 12 use so-called active magnetic scales that are formed from regions of magnetised (N-S) material. The present invention can, however, also be applied to encoder systems that employ so-called passive magnetic scale. Furthermore, the linear encoder system described above provides only relative or incremental position information. In other words, the sine/cosine signal can be analysed (e.g. interpolated) to determine, to a high accuracy, any relative changes in position between the scale and readhead. As will be described below, such high resolution incremental position information determined in accordance with the present invention can be combined with a (e.g. coarser) measurement of absolute position.

Referring to FIG. 15, a readhead 150 is illustrated that is moveable along the length of a scale 152. The scale 152 is formed from a magnetic material (e.g. steel) and comprises a incremental scale track 154 parallel to an absolute scale track 156. The incremental scale track 154 comprises a series of periodically repeating scale markings, such as grooves or humps. The absolute scale track 156 comprises a coded series of scale markings, which can again be provided by grooves or humps. The scale markings of the absolute scale track 156 encode, in a known manner, a series of codewords that define absolute positions along the scale 152.

Referring to FIG. 16, a schematic view of a cross-section through the readhead 150 and scale 152 is provided. The readhead 150 comprises a integrated circuit portion 160 that carries a plurality of Hall sensor elements (not shown in FIG. 16) and a permanent magnet 162. The integrated circuit portion 160 is located between the permanent magnet 162 and the scale 152. The Hall sensor elements of the integrated circuit portion 160 are used to detect any variations in the magnetic field produced by the magnet 162 that arise due to the scale markings of the scale 152. In other words, changes in the magnetic permeability of the scale track 152 provided by the scale markings (e.g. grooves/humps) are sensed by the Hall sensor elements of the integrated circuit portion 160.

Referring to FIG. 17, the use of the readhead 150 to read the scale 152 is illustrated. In particular, FIG. 17 shows the Hall sensor elements of the integrated circuit portion 160. The integrated circuit portion 160 comprises a first set 170 of Hall sensor elements for reading the incremental scale track 154 and a second set 172 of Hall sensor elements for reading the absolute scale track 156.

The first set 170 of Hall sensor elements are evenly spaced apart and the outputs of the sensor elements are combined such that sine and cosine (quadrature phase) signals 174 are produced as the readhead 150 is passed along the scale 152. These sine and cosine signals 174 are interpolated, using a known technique, to provide a fine incremental measure of relative position. The arrangement of the first set 170 of Hall sensor elements, and the manner in which the signals they produce are combined, is described in more detail below.

The second set 172 of Hall sensor elements reads, in parallel, a series of data bits encoded in the absolute scale track 156 and produces signal 176. A data bit "1" is encoded by a sequence of the scale marking (e.g. groove/hump) and an absence of the scale marking, and a bit "0" is represented by a sequence of two absences of the scale marking. It should be noted that each bit of information from the absolute scale track 156 is read with multiple Hall sensor elements of the second set 172, but only data from one selected pair of such Hall sensor elements is used at the same time. In this manner, it is possible to read the coded information from the absolute scale track 156 more reliably. The skilled person would be aware of the various other ways in which absolute position data could be encoded in, and read from, an absolute scale track.

The coarse absolute position information determined from the second set 172 of Hall sensor elements is combined with the fine incremental position information determined from the first set 170 of Hall sensor elements to provide finer resolution absolute position information 178. In this manner, the coarse resolution provided by the absolute position measurements can be refined by the finer (sub-bit length) resolution obtained from the incremental measurements.

Although a single integrated circuit portion 160 is shown in FIG. 17 as providing the first and second sets of Hall sensor elements, it would be possible for such sets of sensors to be formed on separate substrates. The processing circuitry for analysing the signals from the first and second sets of Hall sensor elements may also be provided on the integrated circuit portion 160 or separate processing electronics may be provided to perform some or all of the signal analysis. The integrated circuit portion 160 is thus an example of a position calculation unit for combining an incremental measure of relative position with absolute position measurements.

Referring to FIG. 18, four schemes are illustrated that could be used for combining the signals from the first set 170 of Hall sensor elements in order to generate the sine/cosine signals 174 of FIG. 17. The schemes assume that there are twelve hall sensor elements provided per period of the incremental scale track 154.

Scheme A as outlined in FIG. 18 is based on a known (prior art) scheme that could be used to combine the sensor signals from thirty-nine Hall sensors that read 3.25 periods of the incremental scale track. In such a combination scheme, the sin signal is produced from Hall sensor elements that read three periods of the scale. In particular, the sensor signals from blocks of six adjacent sensor elements are added and subtracted from one another in turn. The cosine signal employs the same combination pattern, but is offset by one quarter of the scale period.

Scheme B as outlined in FIG. 18 is a combination scheme based on the schemes described with reference to FIG. 4 and FIGS. 9-11 above, but extended to use signals from Hall sensor elements placed over 3.25 periods of the incremental scale track 154.

Scheme C1 is similar to scheme B but uses thirty magnetic sensors elements distributed over 2.5 periods of the scale. Scheme C2 is a variant of scheme C1 and employs eighteen magnetic sensor elements distributed over one and a half periods of the scale. Although scheme C2 uses fewer magnetic sensor elements than scheme C1, it has been found that substantially similar performance can be obtained by double weighting the signal from some of these magnetic sensor elements. The double weighted sensor signals of scheme C2 are indicated in FIG. 18 by "×2".

The benefits of the present invention will now be demonstrated with reference to FIGS. 19 to 21 by showing the resultant sine signals produced by certain of the aforementioned combination schemes. Furthermore, the so-called sub-divisional error (SDE) for each of the resultant waveforms has been calculated. The sub-divisional error is effectively a measure of the error associated with any position measurements extracted from the relevant waveform by interpolation. In the examples outlined below, a scale pitch or period of 4 mm is assumed.

Referring to FIGS. 19A-19D, the waveforms produced by the differential reading of a scale using effectively four magnetic sensor elements per period of the scale is illustrated. Such a scheme is analogous to scheme A illustrated in FIG. 18.

Figure 1:
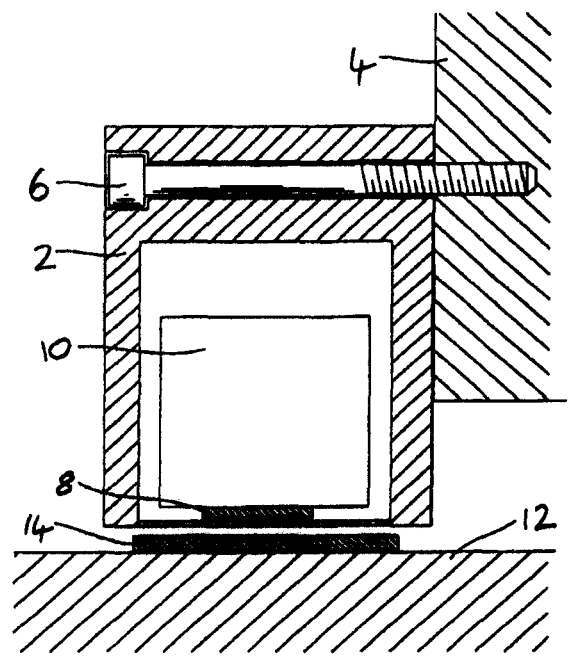
Figure 2:
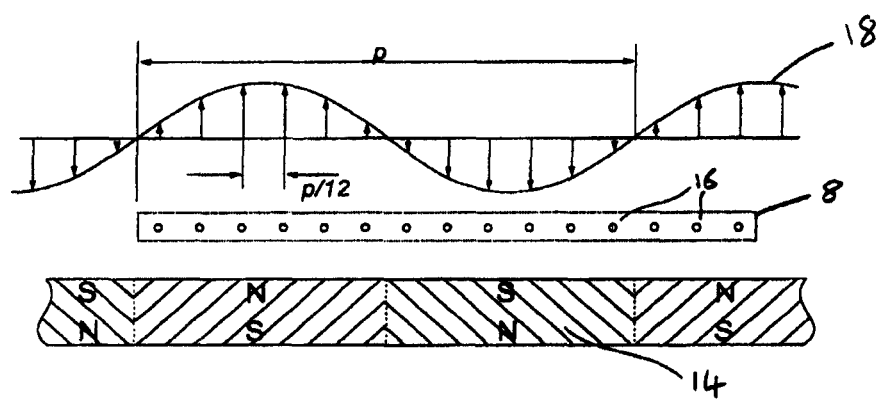
Figures 3, 4:
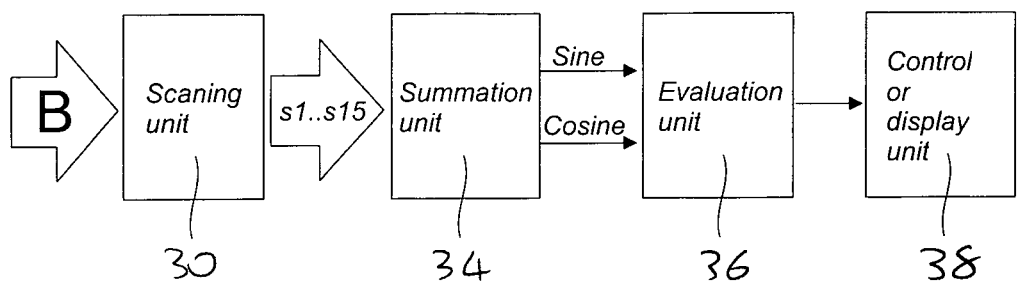
Figure 5:
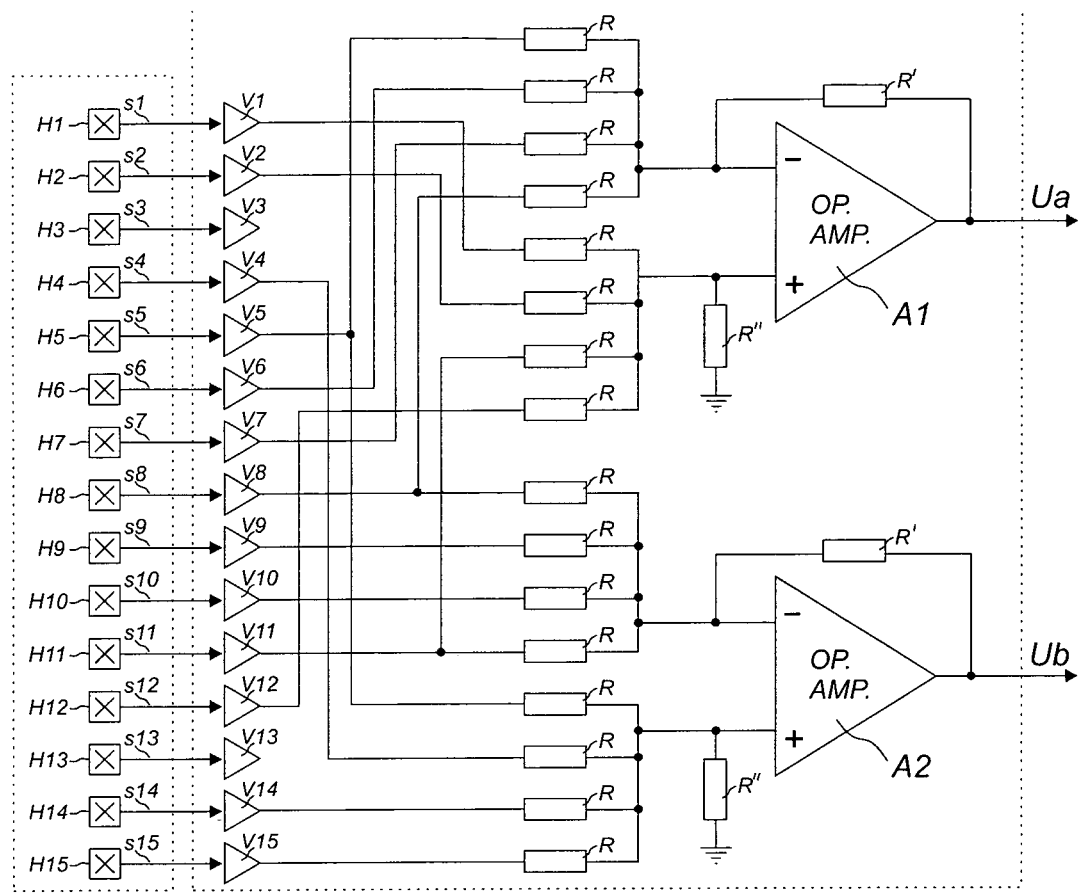
Figure 7:
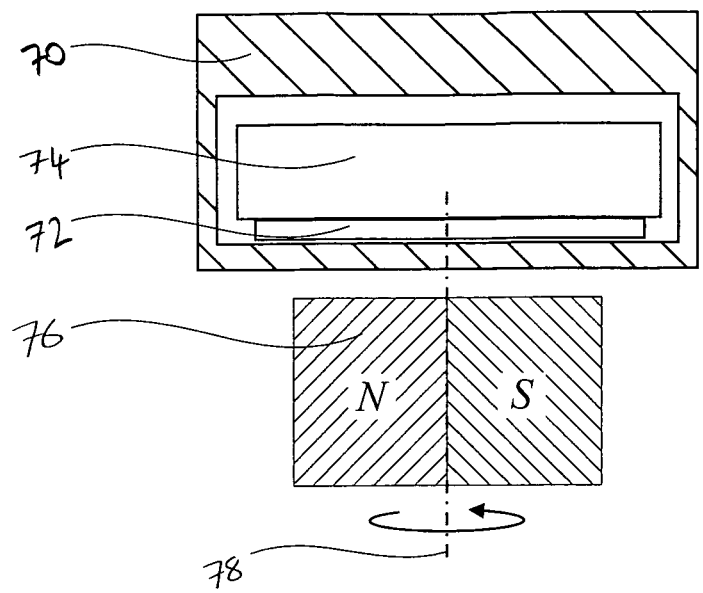
Figure 8:
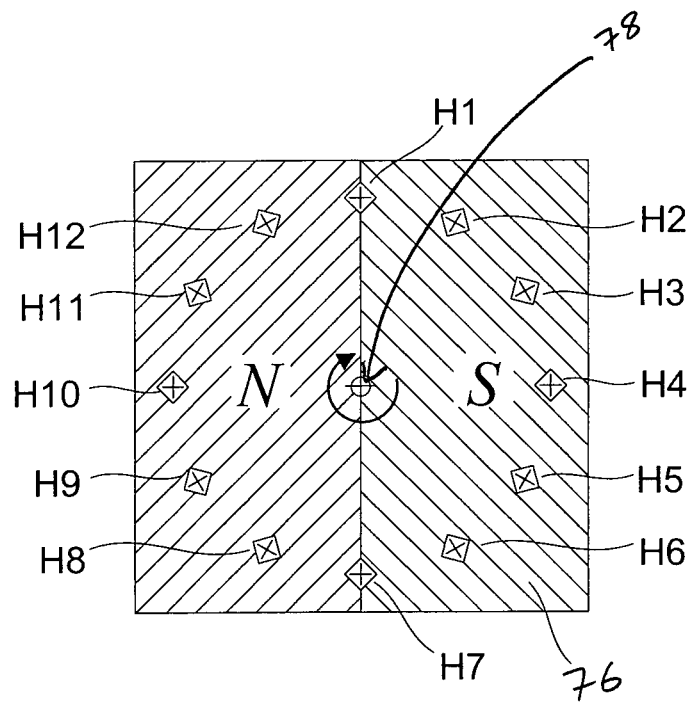
Figures 9, 10:
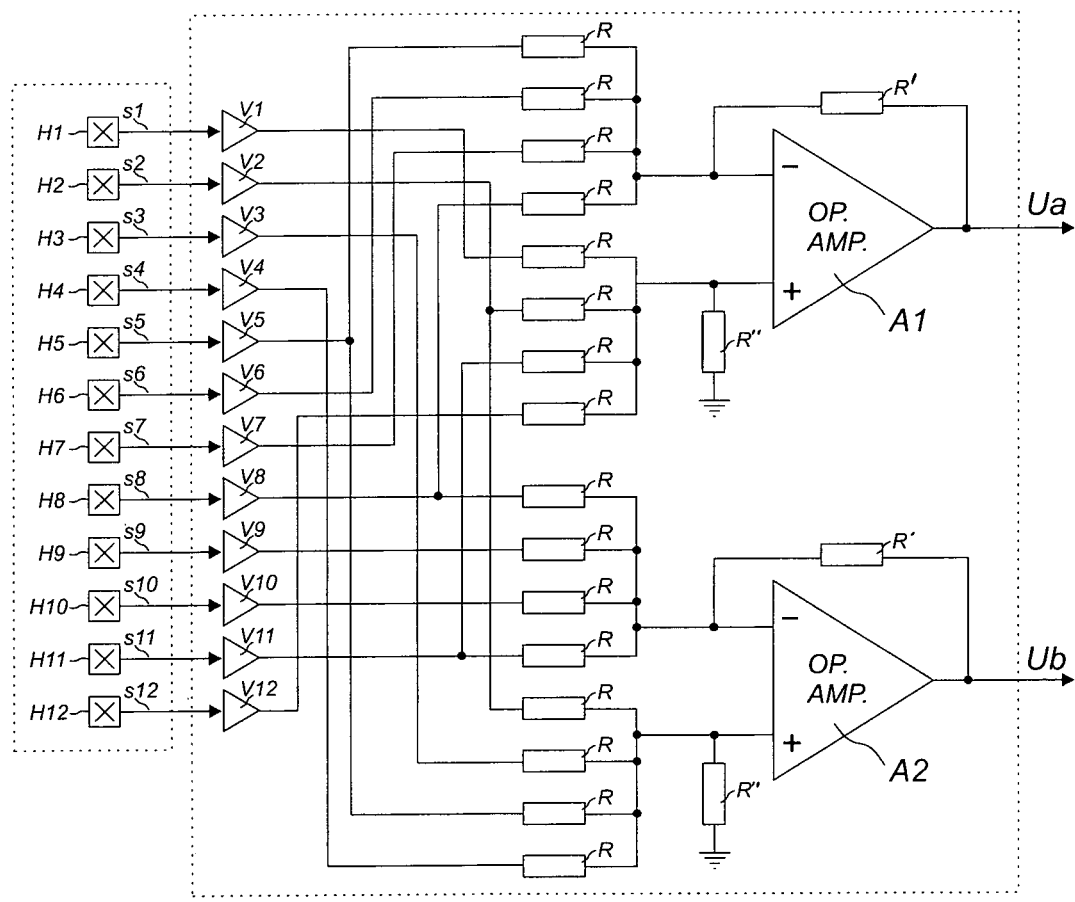
Figure 13:
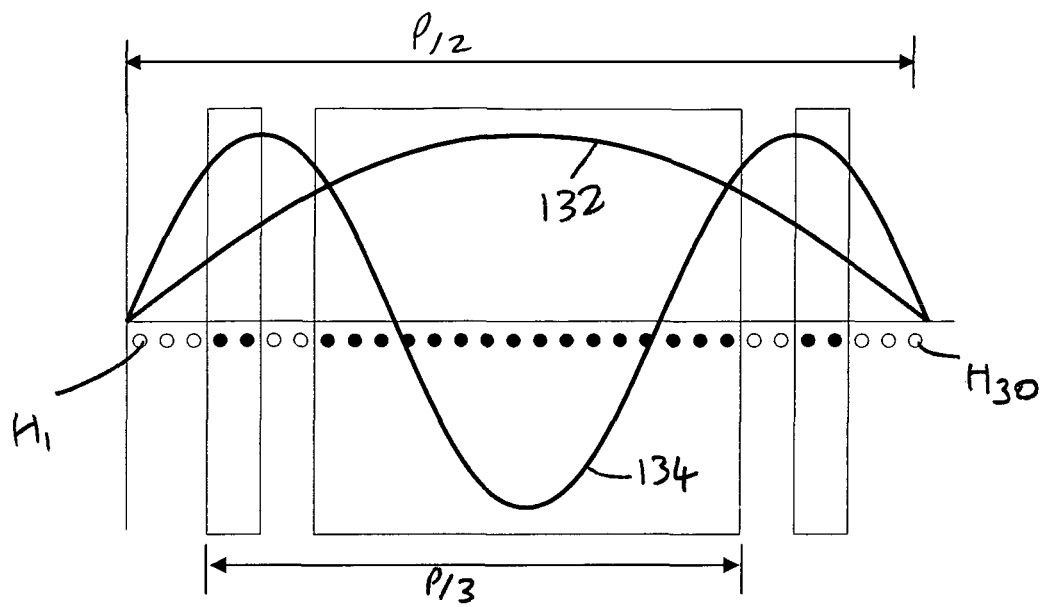
Figure 14:
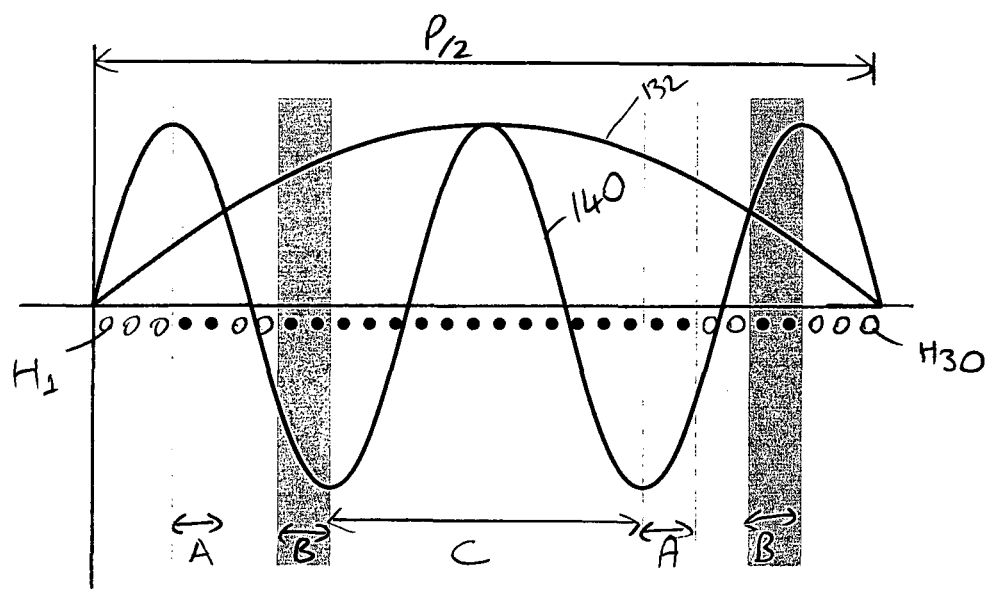
Figure 15:
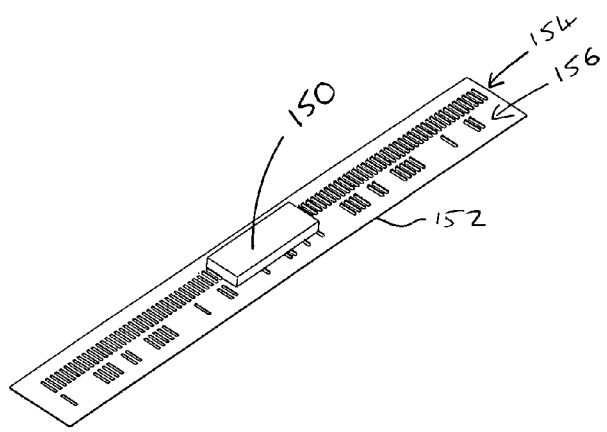
Figure 16:
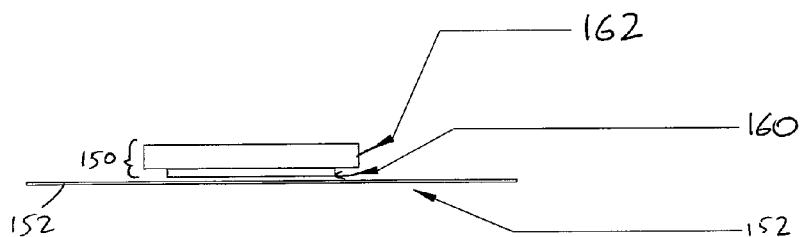
Figure 17:
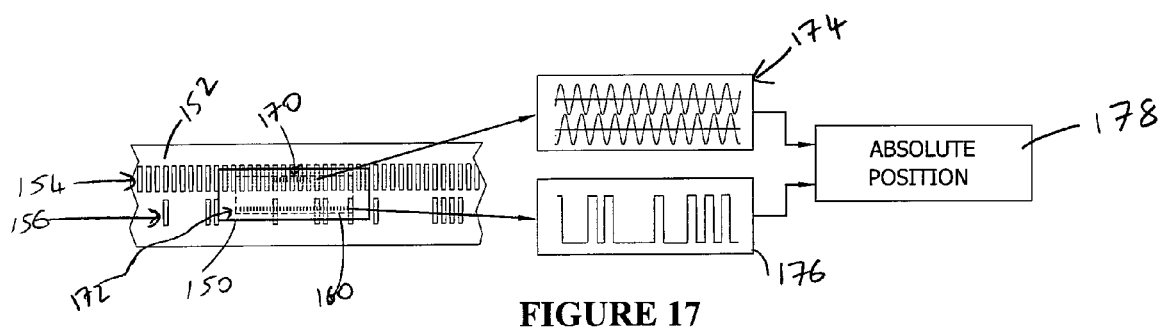
Figure 19A:
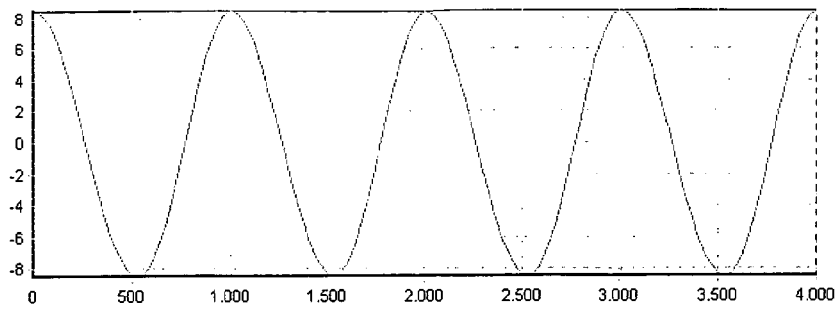
FIG. 19A illustrates the sine signal produced with the readhead spaced apart from the scale by 0.3 mm with 0° pitch. A sub-divisional error of 17 μm is associated with such a signal.
Figure 19B:
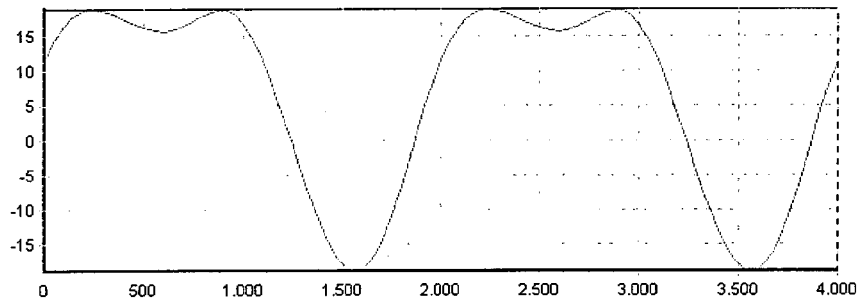
FIG. 19B illustrates the sine signal produced with the readhead spaced apart from the scale by 0.3 mm with 2° pitch. A sub-divisional error of 38.5 μm is associated with such a signal.
Figure 19C:
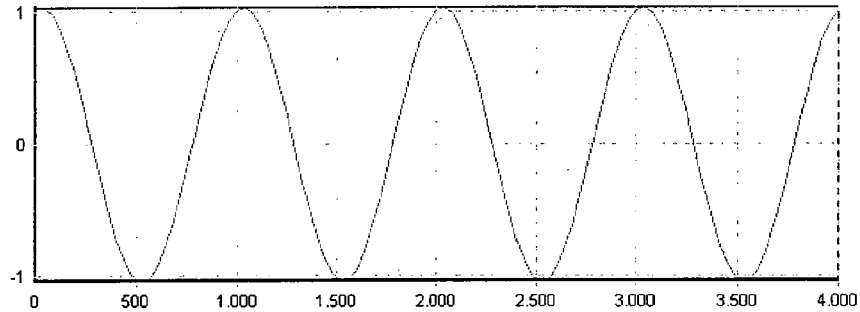
FIG. 19C illustrates the sine signal produced with the readhead spaced apart from the scale by 1.0 mm with 0° pitch. A sub-divisional error of 2 μm is associated with such a signal.
Figure 19D:
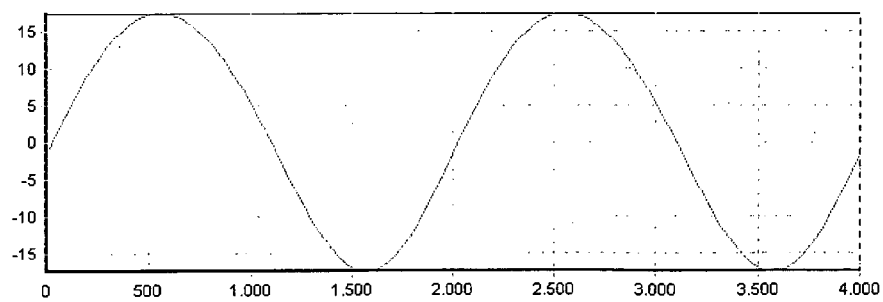
FIG. 19D illustrates the sine signal produced with the readhead spaced apart from the scale by 1.0 mm with 2° pitch. A sub-divisional error of 35 μm is associated with such a signal.

Referring to FIGS. 20A-20D, the waveforms produced when reading a scale using fifteen magnetic sensor elements arranged in the manner described with reference to FIG. 4 are illustrated.

Figure 20A:
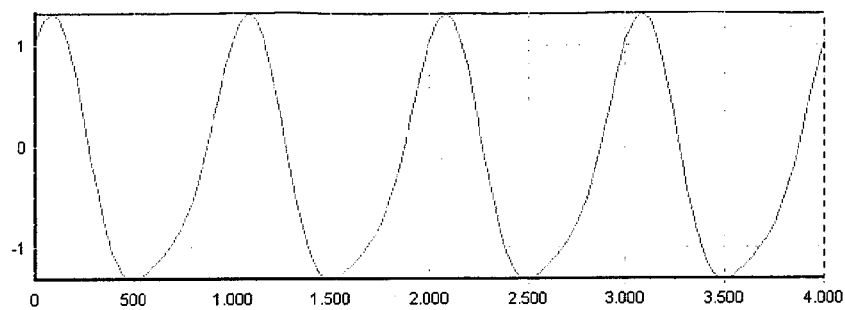

FIG. 20A illustrates the sine signal produced with the readhead spaced apart from the scale by 0.3 mm with 0° pitch. A sub-divisional error of 2.6 μm is associated with such a signal.

Figure 20B:
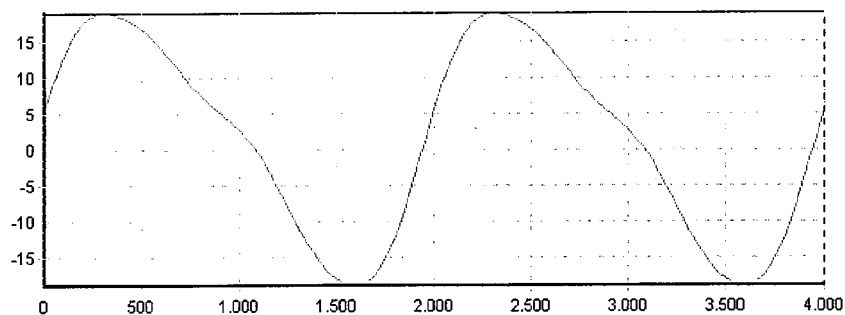

FIG. 20B illustrates the sine signal produced with the readhead spaced apart from the scale by 0.3 mm with 2° pitch. A sub-divisional error of 37 μm is associated with such a signal.

Figure 20C:
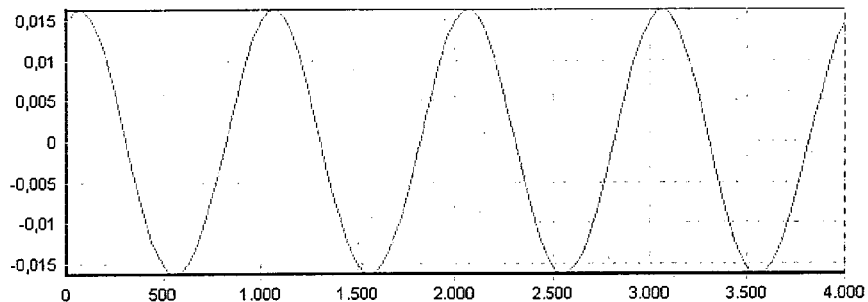

FIG. 20C illustrates the sine signal produced with the readhead spaced apart from the scale by 1.0 mm with 0° pitch. A sub-divisional error of 0.03 μm is associated with such a signal.

Figure 20D:
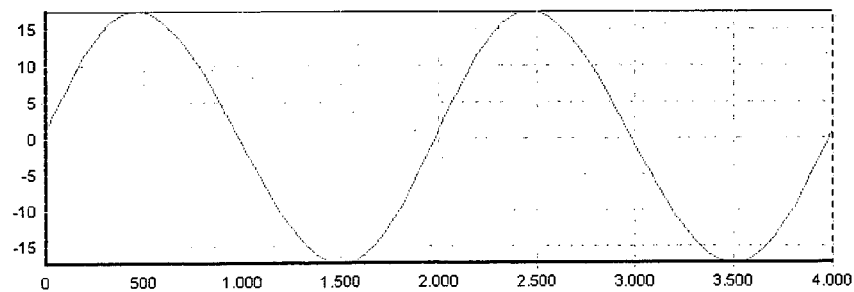

FIG. 20D illustrates the sine signal produced with the readhead spaced apart from the scale by 1.0 mm with 2° pitch. A sub-divisional error of 35 μm is associated with such a signal.

Referring to FIGS. 21A-21D, the waveforms produced when reading a scale using eighteen magnetic sensor elements arranged according to scheme C2 of FIG. 18 are shown.

Figure 21A:
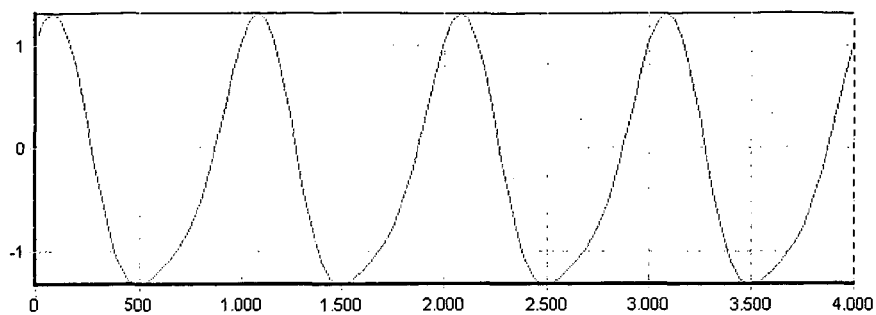

FIG. 21A illustrates the sine signal produced with the readhead spaced apart from the scale by 0.3 mm with 0° pitch. A sub-divisional error of 2.6 μm is associated with such a signal.

Figure 21B:
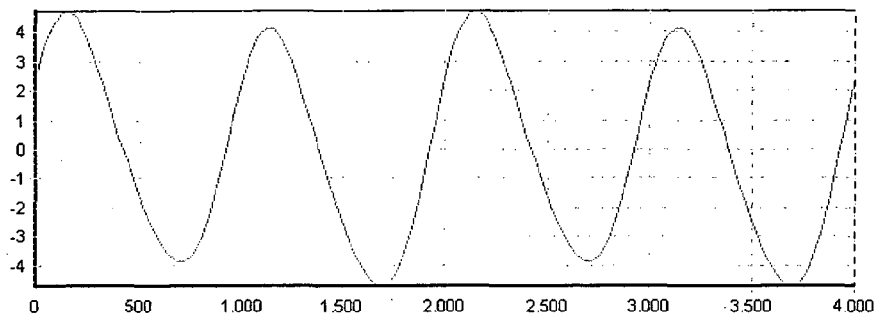

FIG. 21B illustrates the sine signal produced with the readhead spaced apart from the scale by 0.3 mm with 2° pitch. A sub-divisional error of 8.2 μm is associated with such a signal.

Figure 21C:
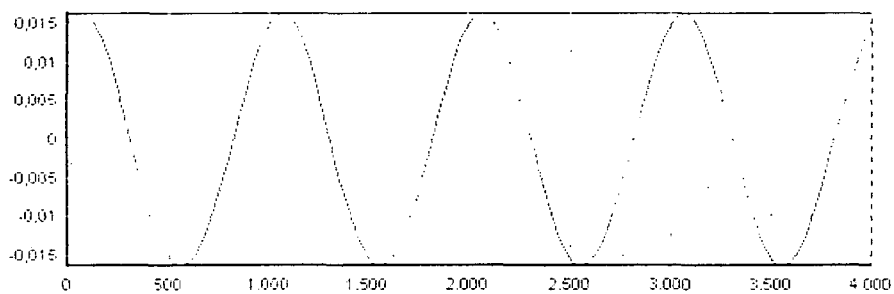

FIG. 21C illustrates the sine signal produced with the readhead spaced apart from the scale by 1.0 mm with 0° pitch. A sub-divisional error of 0.03 μm is associated with such a signal.

Figure 21D:
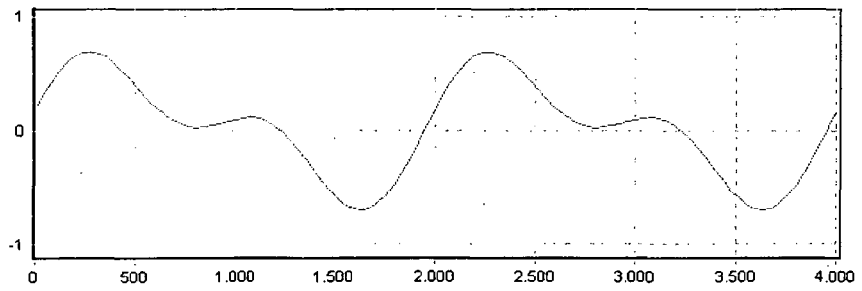

FIG. 21D illustrates the sine signal produced with the readhead spaced apart from the scale by 1.0 mm with 2° pitch. A sub-divisional error of 1.3 μm is associated with such a signal.

It can be seen from FIGS. 20A-20D that the combination scheme described with reference to FIG. 4 reduces the sub-divisional error compared to a differential scheme of the type demonstrated in FIG. 19A-19D. In particular, such a scheme provides significant improvements if the pitch of the readhead relative to the scale is minimized. FIGS. 21A-21D illustrate how the effect of pitch variations can also be reduced using the combination scheme C2 of FIG. 18.

It should be noted that although the above examples are magnetic, the invention could be applied to other types of encoders; e.g. optical, capacitive encoders etc.

The invention claimed is:

1. A scanning device for a position encoder, comprising:
a plurality of sensor elements for generating a plurality of sensor signals; and
a summation unit for generating at least a first summation signal and a second summation signal that provide information on the relative alignment of the scanning device and an associated scale, wherein
the first summation signal is generated from a first subset of the plurality of sensor signals and the second summation signal is generated from a second subset of the plurality of sensor signals,
the plurality of sensor elements are substantially evenly spaced apart from one another and N sensor elements are provided per period of the associated scale, and
N is an integer value and a multiple of three and four, thereby reducing a contribution from the third harmonic to substantially zero in the first summation signal and the second summation signal.

2. The scanning device according to claim 1, wherein the first summation signal and the second summation signal vary periodically as the scanning device is moved relative to the associated scale.

3. The scanning device according to claim 2, wherein the first summation signal comprises a sine signal and the second summation signal comprises a cosine signal.

4. The scanning device according to claim 1, wherein the first subset of the plurality of sensor signals differs from, but overlaps with, the second subset of the plurality of sensor signals.

5. The scanning device according to claim 1, comprising at least twelve sensor elements.

6. The scanning device according to claim 1, wherein the sensor signals of each of the first and/or second subset are only weighted by an integer value prior to being combined by the summation unit.

7. The scanning device according to claim 1 for reading a linear scale that comprises a series of periodically repeating scale markings, wherein the scanning device comprises a linear array of spaced apart sensor elements.

8. The scanning device according to claim 7, wherein the plurality of sensor elements are arranged to cover more than one period of an associated linear scale.

9. The scanning device according to claim 1 for reading a rotary scale, the scanning device comprising a plurality of sensor elements substantially equidistantly spaced from an axis of rotation and separated from one another by a substantially equal angle.

10. The scanning device according to claim 1, wherein the plurality of sensor elements comprise a plurality of magnetic sensor elements.

11. The scanning device according to claim 10, comprising a magnetic, wherein the plurality of sensor elements are located within the magnetic field of the magnet.

12. The scanning device according to claim 1, comprising an interpolation unit for interpolating the first summation signal and the second summation signal to provide an interpolated position output.

13. The scanning device according to claim 12, further comprising an absolute position scale reader for reading data bits from the absolute scale track of an associated scale to provide absolute position information, wherein the scanning device further comprises a position calculation unit for combining the interpolated position output and the absolute position information to provide enhanced resolution absolute position information.

14. The scanning device according to claim 1, wherein at least one of the summation unit and the plurality of sensor elements are provided on a common substrate.

15. A position encoder apparatus comprising the scanning device according to claim 1 and a scale.

16. A method for measuring position, comprising the steps of:
  (i) receiving a plurality of sensor signals from a plurality of sensor elements; and
  (ii) generating a first summation signal from a first subset of the plurality of sensor signals and a second summation signal from a second subset of the plurality of sensor signals, wherein
  the plurality of sensor elements are substantially evenly spaced apart from one another and N sensor elements are provided per period of an associated scale, and
  N is an integer value and a multiple of three and four, thereby reducing a contribution from the third harmonic to substantially zero in the first summation signal and the second summation signal.

* * * * *